(12) United States Patent
Suzuki

(10) Patent No.: US 6,944,649 B1
(45) Date of Patent: Sep. 13, 2005

(54) ELECTRONIC CONTROL UNIT HAVING SINGLE NON-VOLATILE MEMORY FOR MULTIPLE CENTRAL PROCESSING UNITS AND DATA RETRIEVAL METHOD

(75) Inventor: Takanao Suzuki, Toyohashi (JP)

(73) Assignee: Denso Corporation, Kariya (JP)

( * ) Notice: Subject to any disclaimer, the term of this patent is extended or adjusted under 35 U.S.C. 154(b) by 791 days.

(21) Appl. No.: 09/717,270

(22) Filed: Nov. 22, 2000

(30) Foreign Application Priority Data

Nov. 25, 1999 (JP) ............................................. 11-334277
Oct. 25, 2000 (JP) ........................................ 2000-325346

(51) Int. Cl.⁷ ............................................. G06F 15/167
(52) U.S. Cl. ...................... 709/213; 709/200; 709/201; 709/214; 709/215; 709/222
(58) Field of Search ................................ 709/200, 201, 709/213, 214, 215, 222

(56) References Cited

U.S. PATENT DOCUMENTS

| | | | | |
|---|---|---|---|---|
| 4,896,263 A | * | 1/1990 | Brauninger et al. | ........ 709/222 |
| 5,239,634 A | * | 8/1993 | Buch et al. | ................. 711/200 |
| 5,295,258 A | * | 3/1994 | Jewett et al. | .................. 714/12 |
| 5,504,670 A | * | 4/1996 | Barth et al. | ..................... 700/5 |
| 5,506,994 A | * | 4/1996 | Sugita | ........................... 712/37 |
| 5,884,055 A | * | 3/1999 | Tung et al. | ................. 710/307 |
| 5,890,080 A | * | 3/1999 | Coverdill et al. | ............. 701/29 |
| 6,311,204 B1 | * | 10/2001 | Mills | .......................... 718/100 |

FOREIGN PATENT DOCUMENTS

JP          2595298          1/1997

* cited by examiner

*Primary Examiner*—Nabil El-Hady
(74) *Attorney, Agent, or Firm*—Nixon & Vanderhye P.C.

(57) ABSTRACT

An electronic control unit for engines or vehicles has multiple CPUs and a single non-volatile memory such as an EEPROM. The CPUs are programmed to directly receive data from the EEPROM. The CPUs may be programmed to generate respective data retrieving commands when the EEPROM is not being accessed for data retrieval. In this instance, the CPUs execute respective system register initialization processing differently from each other after a start of power supply. For instance, the system register initialization processing of a first CPU is divided while the system register initialization processing of a second CPU is not divided. Alternatively, the CPUs may be programmed to generate a data retrieving command only from the first CPU and receive the retrieved data by both the first CPU and the second CPU at the same time.

23 Claims, 5 Drawing Sheets

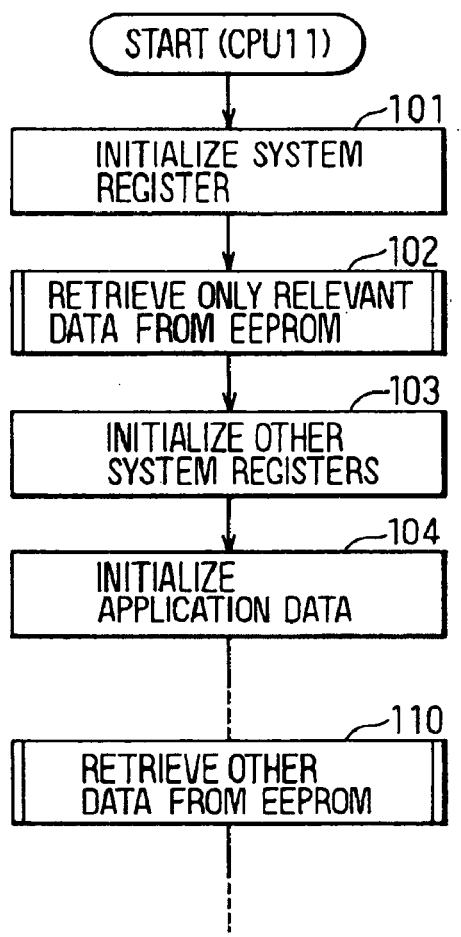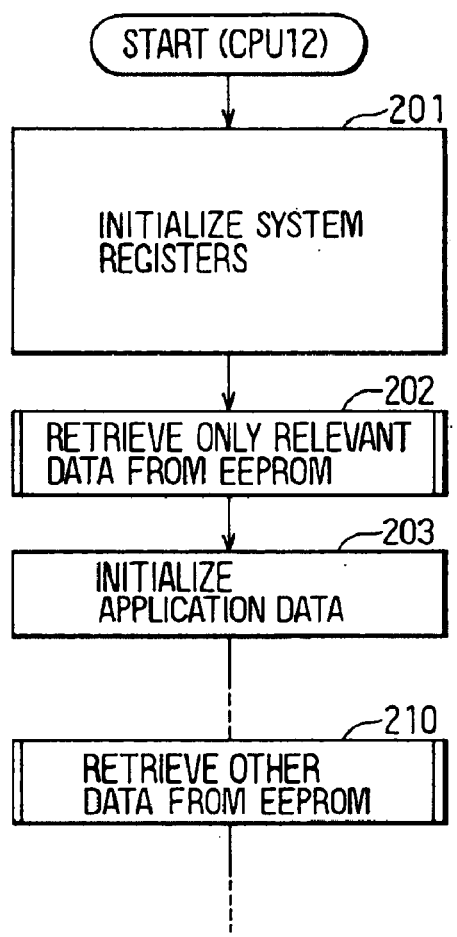

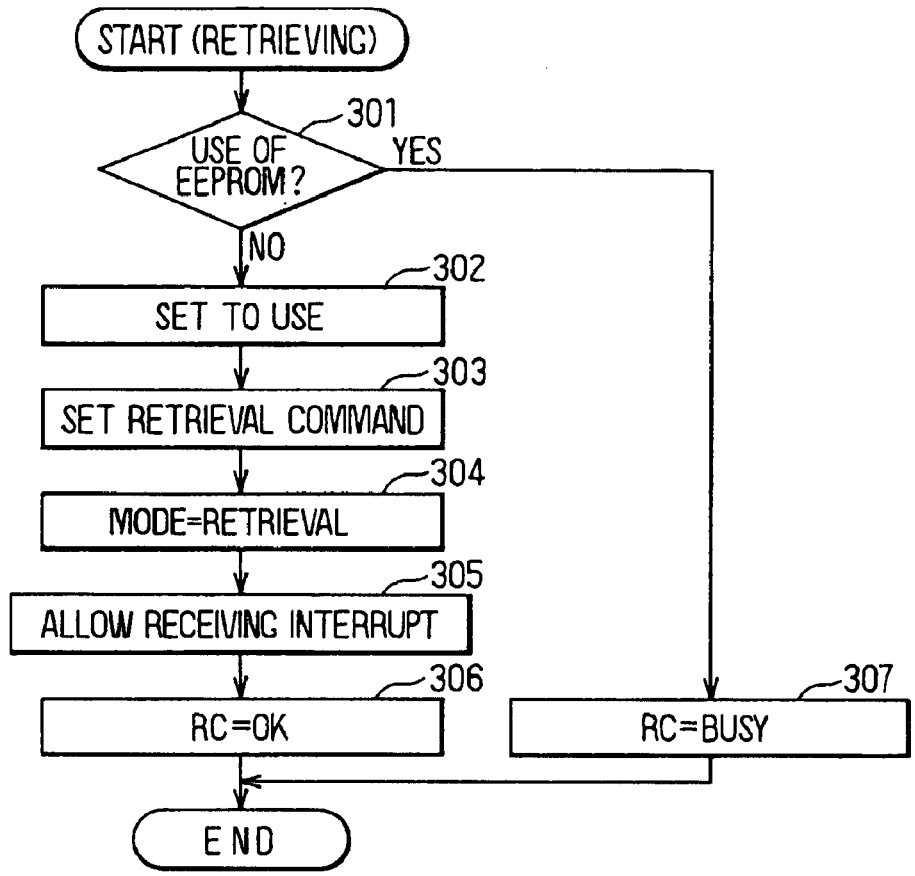

ELECTRONIC CONTROL UNIT HAVING SINGLE NON-VOLATILE MEMORY FOR MULTIPLE CENTRAL PROCESSING UNITS AND DATA RETRIEVAL METHOD

CROSS REFERENCE TO RELATED APPLICATION

This application is based on and incorporates herein by reference Japanese Patent Applications No. 11-334277 filed Nov. 25, 1999 and No. 2000-325346 filed Oct. 25, 2000.

BACKGROUND OF THE INVENTION

This invention relates to an electronic control unit having a single non-volatile memory for multiple central processing units.

An electronic control unit (ECUs) for engines or vehicles use multiple central processing units (CPUs) and non-volatile memories such as electrically erasable programmable read-only memories (EEPROMs). The EEPROM is used to store therein, even when a power supply from a storage battery to the ECU is turned off, a vehicle export destination, a transmission type (manual or automatic), an engine type (natural aspirated or turbo charged), a vehicle identification code (VIN), malfunction information and the like.

U.S. Pat. No. 4,896,263 teaches to use a single EEPROM for multiple CPUs so that the EEPROM is shared by the multiple CPUs. In this instance, as shown in FIG. 8, CPUs 11 and 12 are connected to each other through communication lines 14 and 15 and only the CPU 16 is connected to an EEPROM 13 through a signal line 16 in an ECU 10. The CPU 11 retrieves or reads out data from the EEPROM 13 and transmits the retrieved data to the CPU 12 through the communication line 14, when initialization of software is effected. The CPU 11 receives all data of the CPU 12 to be written and stored in the EEPROM 13 through the communication line 15 and transmits the received data to the EEPROM 13.

In this ECU 10, as the EEPROM 13 is accessed via the CPU 11, the EEPROM access time of the CPU 11 increases and the communication data between the CPUs 11 and 12 increases. Further, in the initialization operation of the software, the CPU 12 is enabled to use the data of the EEPROM 13 only after the retrieved data are transmitted from the CPU 11, thus resulting in a time delay of using the retrieved data in the CPU 12.

SUMMARY OF THE INVENTION

It is an object of the present invention to provide an electronic control unit which is capable of efficiently accessing an electrically erasable programmable read-only memory and reducing communication data between multiple central processing units.

According to the present invention, an electronic control unit has multiple CPUs and a single non-volatile memory such as an EEPROM. The CPUs are programmed to directly receive data from the non-volatile memory without communication of retrieved data among the CPUs.

The CPUs may be programmed to generate respective data retrieving commands when the non-volatile memory is not being accessed for data retrieval by other CPUs. In this instance, the CPUs execute respective system register initialization processing differently from each other after a start of power supply to the CPUs. Preferably, the system register initialization processing of a first CPU is divided while the system register initialization processing of a second CPU is not divided so that the data retrieving commands may be generated at different time points between the CPUs.

Alternatively, the CPUs may be programmed to generate a data retrieving command only from a first CPU and receive the retrieved data by both the first CPU and the second CPU at the same time.

BRIEF DESCRIPTION OF THE DRAWINGS

The above and other objects, features and advantages of the present invention will become more apparent from the following detailed description made with reference to the accompanying drawings. In the drawings:

FIGS. 2A and 2B are flow diagrams showing main routines of a first CPU and a second CPU used in the first embodiment;

FIG. 3 is a flow diagram showing a retrieval request processing in the first embodiment;

FIG. 4 is a flow diagram showing a receiving interrupt processing in the first embodiment;

DETAILED DESCRIPTION OF THE PREFERRED EMBODIMENT

The present invention will be described with reference to various embodiments, in which an electronic control unit (ECU) is constructed with a pair of central processing units (CPUs) and a single non-volatile memory to control engine and vehicle operations.

(First Embodiment)

Figure 1:
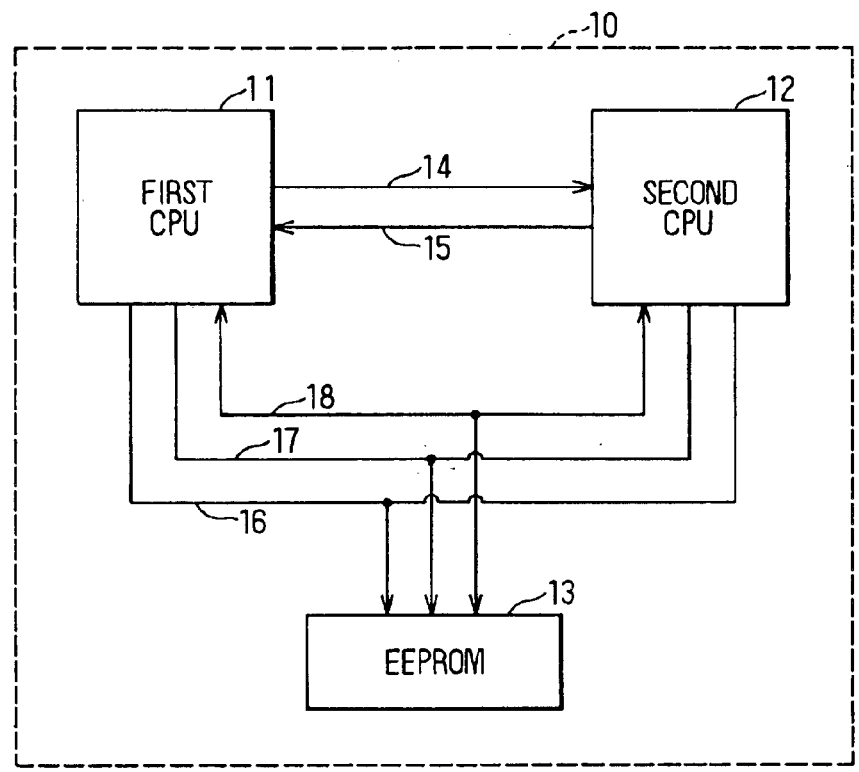
FIG. 1 is a block diagram showing an electronic control unit according to a first embodiment of the present invention.
Figure 8:
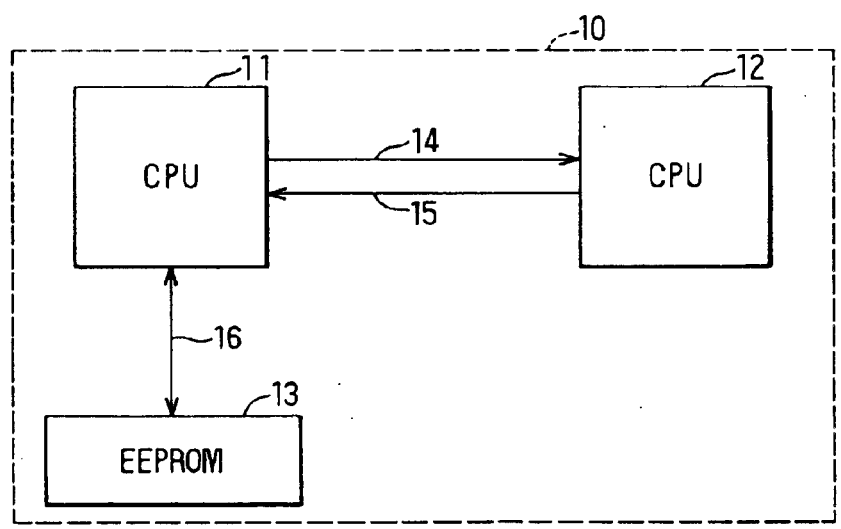
FIG. 8 is a block diagram showing an electronic control unit according to a prior art.

Referring first to FIG. 1, an ECU 10 has a first CPU 11, a second CPU 12 and a single electrically erasable programmable read-only memory (EEPROM) 13 which is a non-volatile type. The CPUs 11 and 12 are connected to each other through general ports or communication lines 14 and 15. The CPUs 11 and 12 are also connected to the EEPROM 13 through a chip select line 16 for data reading/writing, a clock line 17 and a serial communication interface (SCI) line 18 by sharing those lines. Here, the active level of the communication lines 14 and 15 which indicates that the EEPROM 13 is in use is defined with the low (L) level of the communication lines 14 and 15.

The CPUs 11 and 12 are programmed to execute various processing shown in FIGS. 2A, 2B to FIG. 6. Data retrieving processing for retrieving data from the EEPROM 13 in the course of initialization of software is executed as shown in FIGS. 2A and 2B. When the ECU 10 is supplied with electric power, both CPUs 11 and 12 start to operate at almost the same time, and the CPUs 11 and 12 execute initializations in the main routines shown in FIGS. 2A and 2B.

Specifically, as shown in FIG. 2A, the first CPU 11 initializes at step 101 only a system register of all of its system registers that is required to access the EEPROM 13. The CPU 11 retrieves or reads out only relevant data of all the stored data from the EEPROM 13 at step 102. The relevant data may be data which are relatively important to control a vehicle. Such data includes a vehicle export destination, a transmission type (manual or automatic), an engine type (natural aspirated or turbo charged), a vehicle identification code (VIN) and malfunction information. Thus, the initialization operation immediately after starting the power supply can be shortened and the access time to the EEPROM 13 can be shortened, by initializing only the relevant data with priority.

The CPU 11 then initializes the other system registers at step 103, and initializes application data at step 104, thus completing a sequence of initializations immediately after the start of power supply. The EEPROM data have already been retrieved at the time of initializing the application data. Thus, application processing can be appropriately changed by using the EEPROM data. When the other data in the EEPROM 13 become necessary in the course of execution of various normal controls, the CPU 11 retrieves other required data from EEPROM 13 at step 110.

The second CPU 12 initializes all of its system registers at step 201 as shown in FIG. 2B, as opposed to the CPU 11 which initializes the system registers in two stages (steps 101 and 103). The CPU 12, in the similar manner as the CPU 11, retrieves only relevant data at step 202, initializes application data at step 203 and retrieves other data from EEPROM 13 at step 210. The relevant data retrieved at step 202 may be the similar data as retrieved at step 102.

As the CPU 12 initializes all the system registers at step 201, the timing of access to the EEPROM 13 is delayed. As a result, initialization can be effected efficiently because no waiting time for accessing the EEPROM 13 is necessitated.

Each EEPROM data retrieving processing of the first CPU 11 and the second CPU 12 is shown in FIGS. 3 and 4, and is described particularly with respect to the first CPU 11. The routine of FIG. 3 is initiated each time step 102 or 110 of FIG. 2A (step 202 or 210 in FIG. 2B) is executed or each time an EEPROM data retrieval is requested by time-synchronized processing. The routine of FIG. 3 is designed to handle the case in which the accesses to the EEPROM 13 overlap at step 110 (step 210).

As shown in FIG. 3, the CPU 11 checks at step 301 whether the EEPROM 13 is being used or accessed by the second CPU 12. This determination may be made by checking whether the signal level of the communication line 15 is low (L). If the check result is YES, the processing jumps to step 307 and sets a return code (RC) to "BUSY" which indicates that the EEPROM data cannot be retrieved. If the check result is NO, the CPU 11 sets at step 302 the signal level of the communication line 14 to low (L) to notify the CPU 12 that the EEPROM 13 is in use, so that the EEPROM 13 may be used for retrieving data. The CPU 11 then sets a retrieval command in a transmission register at step 303. The CPU 11 sets a retrieval mode at step 304 and allows a receiving interrupt at step 305. The CPU 11 finally sets at step 306 the return code to "OK" which indicates that the EEPROM data can be retrieved.

The CPU 11 initiates the routine of FIG. 4 upon receiving the data receiving interrupt from EEPROM 13. The CPU prohibits at step 401 receiving interrupts, and receives data from EEPROM 13 at step 402. The received data is copied from a register to a random access memory (RAM) in the CPU 11. The CPU 11 resets the mode to "NONE" at step 403, and resets the signal level of the communication line 14 to high (H) thus notifying the CPU 12 that the EEPROM 13 is in non-use, that is, the EEPROM data can be retrieved.

In the above operation, the check result at step 301 is YES without fail each time the routine of FIG. 3 is initiated in response to step 102 (step 202). As a result, the subsequent EEPROM data retrieving processing can be executed immediately.

Figure 5:
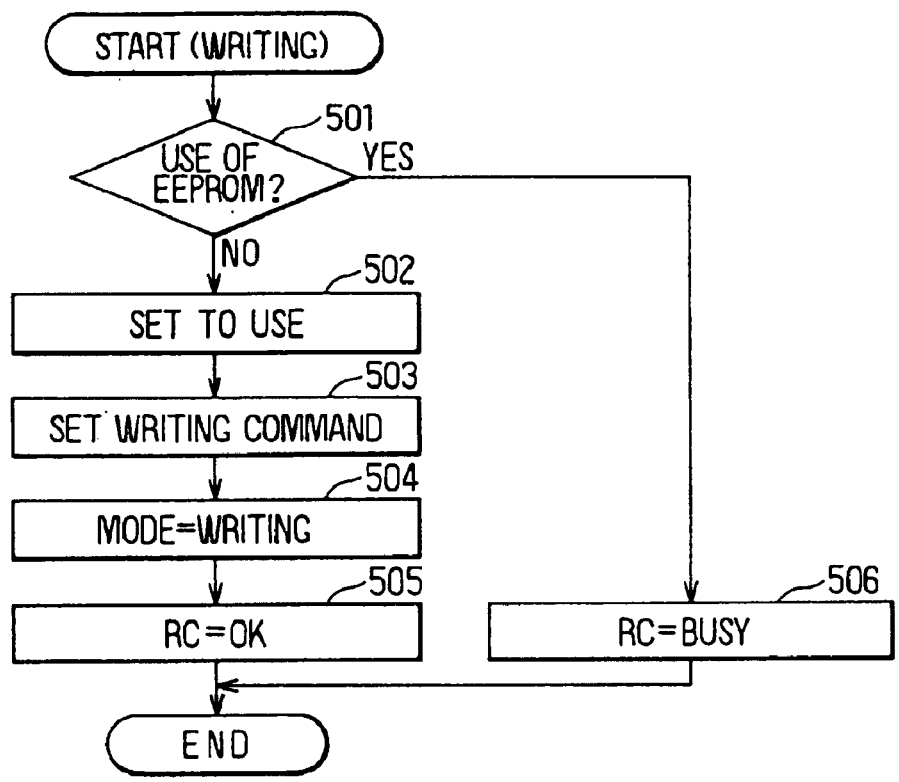
FIG. 5 is a flow diagram showing a writing request processing in the first embodiment.
Figure 6:
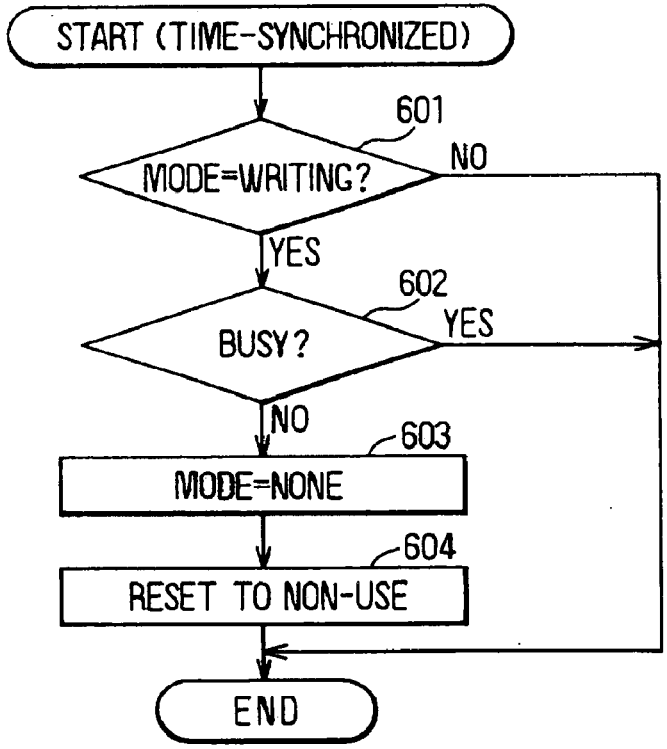
FIG. 6 is a flow diagram showing a time-synchronized processing in the first embodiment.

Each EEPROM data writing processing of the first CPU 11 and the second CPU 12 is shown in FIGS. 5 and 6, and is described particularly with respect to the first CPU 11. The routine of FIG. 5 is initiated each time an EEPROM data writing is requested by, for instance, time-synchronized processing.

As shown in FIG. 5, the CPU 11 checks at step 501 whether the EEPROM 13 is being used or accessed by the second CPU 12. This determination may be made by checking the signal level of the communication line 16. If the check result is YES, the processing jumps to step 506 and sets a return code (RC) to "BUSY" which indicates that the EEPROM data cannot be written. If the check result is NO, the CPU 11 sets at step 502 the signal level of the communication line 14 to low (L) to notify the CPU 12 that the EEPROM 13 is in use so that the data may be written into the EEPROM 13. The CPU 11 then sets a writing command in a transmission register at step 503. The CPU 11 finally sets at step 506 the return code to "OK" which indicates that the EEPROM data can be written.

The CPU 11 initiates a time-synchronized routine of FIG. 6 upon receiving a writing interrupt at a predetermined interval. The CPU 11 checks at step 601 whether the mode is set to the writing mode. If the check result is YES, the CPU 11 further checks at step 602 whether the EEPROM 13 is busy, that is, the EEPROM 13 is in the writing command processing. If the check results at steps 601 and 602 are NO and YES, respectively, the routine ends. If the check result at step 602 is NO, the CPU 11 resets the mode to "NONE" at step 603 and returns the signal level of the communication line 14 to high (H) at step 604 to notify the CPU 12 that the EEPROM 13 has been set to non-use.

In the first embodiment, one CPU (for instance, CPU 11) checks at steps 301 and 501 whether the other CPU (for instance, CPU 12) is accessing the EEPROM 13, before accessing the EEPROM 13 for data retrieving or writing. It notifies the other CPU at steps 302 and 502 that it will access the EEPROM 13. After completing the access to the EEPROM 13, it resets the notification of access at steps 404 and 604. With these notifications, the other CPU accesses directly the EEPROM 13 without data communication between the CPUs. Thus, the access time can be shortened and the amount of data communicated between the CPUs can be reduced remarkably.

Further, the CPUs 11 and 12 are programmed to access the EEPROM 13 at different time points in the course of respective initialization operations. As a result, the access wait time can be eliminated and the initialization operation can be completed in a short period of time.

Still further, only the relevant data of high priority such as the vehicle information and malfunction information are retrieved first in the initialization operation of the ECU 10, and other data of low priority are retrieved later when requested in the normal control operation other than the initialization operation. As a result, the initialization operation of the CPUs 11 and 12 can be shortened further.

In addition, the EEPROM data are retrieved before the initialization of the application data. As a result, the processing can be switched from one to another with reference to the EEPROM data in the course of executing the application processing.

The first embodiment may be modified in various ways. For instance, the use or non-use of the EEPROM 13 may be checked by chip-select state indicated by the signal level of the chip select interface (SCI) line 18 without connecting the first CPU 11 and the second CPU 12 via the communication lines (ports) 14 and 15. Further, the EEPROM data may be shared by more than two CPUs. In this instance, it is preferred to divide the initialization processing of system registers and the initialization processing of application data of each CPU so that each CPU executes the EEPROM data retrieval at different time points from other CPUs.

(Second Embodiment)

Figure 7A:
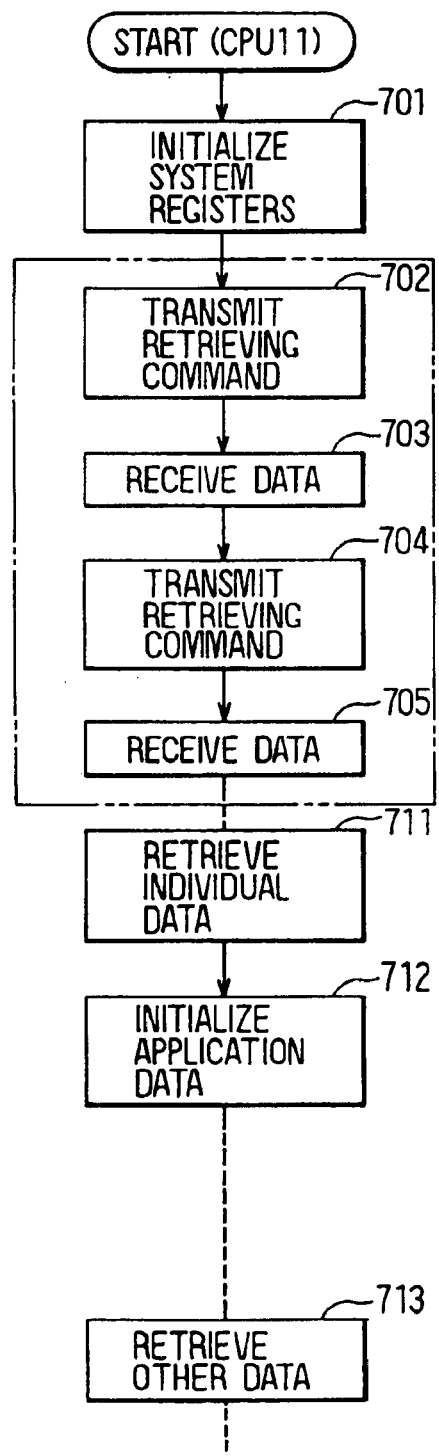
FIGS. 7A and 7B are flow diagrams showing main routines of a first CPU and a second CPU according to a second embodiment of the present invention.
Figure 7B:
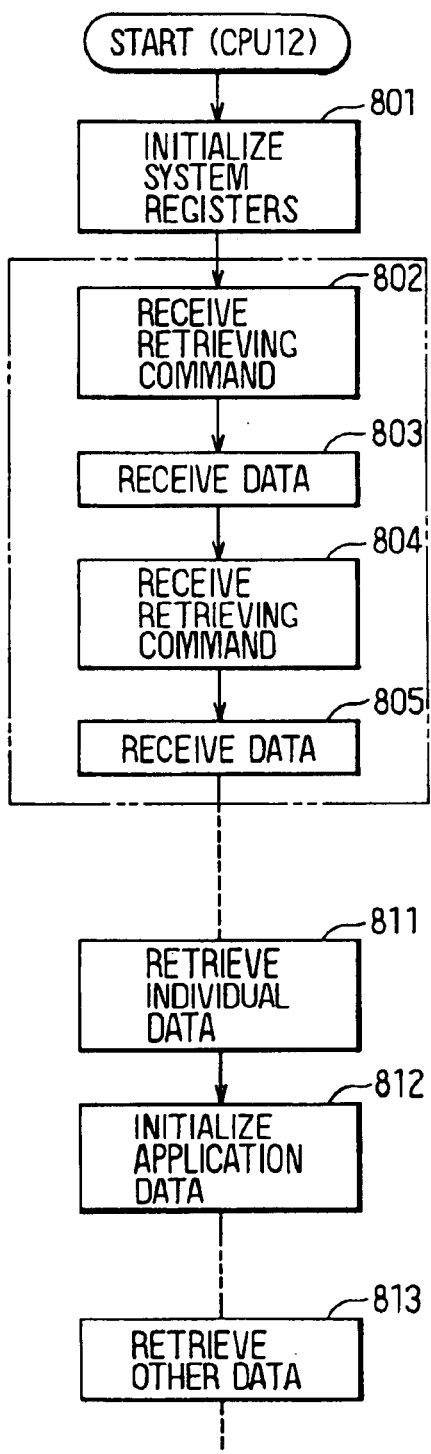

In a second embodiment, the first CPU 11 and the second CPU 12 are programmed as shown in FIGS. 7A and 7B, respectively, so that EEPROM data, which are to be shared by each CPU, are retrieved at the same time from the EEPROM 13 in the initialization processing thereby to shorten the time period required for the initialization operation. In the second embodiment, the first CPU 11 and the second CPU 12 are used as a master CPU and a slave CPU, respectively. When the power supply to the ECU 10 is started, the CPUs 11 and 12 start executing the respective routines.

As shown in FIG. 7A, the first CPU 11 initializes its system registers at step 701. The CPU 11 then transmits a retrieving command to the CPU 12 and the EEPROM 13 through the SCI line 18 (FIG. 1) at step 702, so that EEPROM data which are shared by both CPUs 11 and 12 are retrieved. The retrieving command identifies which one of the shared data (address) is to be retrieved. The CPU 11 receives through the SCI line 18 the EEPROM data retrieved from the EEPROM 13 in response to the shared data retrieving command. The CPU 11 further transmits a retrieving command and receives EEPROM data at steps 704, 705 and the like repeatedly in the similar manner as at steps 702 and 703.

After the above retrieval of the EEPROM data to be shared, the CPU 11 then retrieves at step 711 individual data from the EEPROM 13 to be used individually by the CPU 11. The CPU 11 then initializes the application data at step 712 and retrieves other data from the EEPROM 13 at step 713 when requested in the course of its normal control processing.

As shown in FIG. 7B, the second CPU 12 initializes its system registers at step 801. The CPU 12 then receives at step 802 the shared data retrieving command which the CPU 11 issued at step 702 through the SCI line 18 (FIG. 1). The CPU 12 receives at step 803 through the SCI line 18 the EEPROM data retrieved from the EEPROM 13 in response to the retrieving command of the CPU 11. The CPU 12 further receives the retrieving command and receives EEPROM data at steps 804, 805 and the like repeatedly in the similar manner as at steps 802 and 803.

After the above retrieval of the EEPROM data to be shared, the CPU 12 then retrieves at step 811 individual data from the EEPROM 13 to be used individually by the CPU 12. The CPU 12 then initializes the application data at step 812 and retrieves other data from the EEPROM 13 at step 813 when requested in the course of its normal control processing.

According to the second embodiment, each shared data transmitted from the EEPROM 13 in response to the shared data retrieving commands of one CPU 11 is received by both CPUs 11 and 12 at the same time. As the CPU 12 receives each shared data retrieval command from the CPU 11 through the SCI line 18, the CPU 12 can recognize which one of the shared data it will receive. When the individual data are retrieved one by one after the retrieval of the shared data, the retrieval of all data required for the initialization operations of the CPUs 11 and 12 is completed. In each of the CPUs 11 and 12, all the retrieved data are stored in corresponding addresses of the respective RAMS.

Thus, each data to be shared by the CPUs 11 and 12 is retrieved in one retrieval operation, thereby shortening the initialization processing. As the shared data retrieval is started immediately after the initializations of the system registers in the CPUs 11 and 12, the timing of data retrieving operations of the CPUs 11 and 12 can be synchronized. As a result, the shared data is ensured to be received by both CPUs 11 and 12 at the same time.

The second embodiment may also be modified in various ways. For instance, the synchronization of operations between the CPUs 11 and 12 may be effected based on the signal level of the chip select interface (CSI) line 18 when the operating frequency of the CPUs 11 and 12 are different from each other, in place of starting the shared data retrieving immediately after the initialization of the system registers. Further, in case that the EEPROM data are shared by more than two CPUs, the ECU 10 may be constructed so that one of the CPUs issues the data retrieving command and transmits the same to the other CPUs.

The present invention should not be limited to the disclosed embodiments and modifications, but may be implemented in many other ways without departing from the spirit of the invention.

What is claimed is:

1. An electronic control unit comprising:
   a plurality of CPUs;
   a single non-volatile memory; and
   communication ports connecting the CPUs and the non-volatile memory with one another,
   wherein a first one of the CPUs is programmed to (a) check whether a second one of the CPUs is accessing the non-volatile memory before accessing the non-volatile memory, (b) send to the second CPU a notification that the first CPU will access the non-volatile memory when a check result indicates that the second CPU is not accessing the non-volatile memory, and (c) stop the notification to the second CPU after completing an access to the non-volatile memory.

2. The electronic control unit as in claim 1, wherein:
   the CPUs are connected through the ports; and
   the first CPU is programmed to set a signal level of the port to a level indicative of its accessing when starting to access the non-volatile memory.

3. The electronic control unit as in claim 1 wherein:
   the CPUs are programmed to execute respective accessing to the non-volatile memory at different time points in initialization operations executed when a power supply to the CPUs is started.

4. The electronic control unit as in claim 3, wherein:
   the first CPU is programmed to execute initialization operations of system registers thereof in a divided manner thereby to differentiate the time points of its initialization operations from that of the second CPU.

5. The electronic control unit as in claim 3, wherein:
   the CPUs are programmed (a) to retrieve only specified high-priority data from the non-volatile memory in their respective initialization operations, and (b) to retrieve other low-priority data from the non-volatile memory only when required after completion of initialization operations.

6. An electronic control unit comprising:

a plurality of CPUs;

a single non-volatile memory; and communication ports connecting the CPUs and the non-volatile memory with one another, wherein a first one of the CPUs is programmed to transmit a data retrieving command to the non-volatile memory, and both the first CPU and a second CPU are programmed to receive at the same time the same data from the non-volatile memory retrieved in response to the data retrieving command of the first CPU thereby to share the same retrieved data.

7. The electronic control unit as in claim 6, wherein the second CPU is programmed to receive the data retrieving command from the first CPU.

8. The electronic control unit as in claim 6, wherein:

the first CPU and the second CPU are programmed to be synchronized with each other and receive the same data from the non-volatile memory after being synchronized.

9. The electronic control unit as in claim 6, wherein:

the first CPU and the second CPU are programmed to retrieve respective individual data other than the same data separately from each other after receiving the same data.

10. The electronic control unit as in claim 6, wherein:

only the first CPU is programmed to transmit the data retrieving command as a master CPU, and the second CPU is programmed to receive the data retrieving command before receiving the same data from the non-volatile memory.

11. A data retrieving method in an electronic control unit having a first CPU, a second CPU and a single non-volatile memory, the method comprising:

generating a data retrieving command from the first CPU and notifying the second CPU that the first CPU transmits the data retrieving command to the non-volatile memory;

retrieving data from the non-volatile memory in response to the data retrieving command; and receiving the retrieved data by at least the first CPU directly from the non-volatile memory.

12. The method as in claim 11, further comprising:

initializing a system register of the first CPU before generating the data retrieving command, the system register being associated with an access operation of the first CPU to the non-volatile memory; and initializing other system registers of the first CPU after receiving the data from the non-volatile memory by the first CPU.

13. The method as in claim 12, further comprising:

initializing all system registers of the second CPU before generating a data retrieving command from the second CPU, so that data retrieving command from the second CPU, is delayed so that data retrieving operations of the first CPU and the second CPU occurs at different time points.

14. The method as in claim 11, further comprising:

generating a data retrieval command from the second CPU by checking that the first CPU is not accessing the non-volatile memory, wherein the first CPU and the second CPU are capable of directly retrieving data from the non-volatile memory, respectively, independently of each other.

15. The method as in claim 14, wherein:

the first CPU and the second CPU retrieves only predetermined high-priority data from the non-volatile memory.

16. The method as in claim 11, wherein:

the data retrieving command is generated only by the first CPU; and the retrieved data is received by both the first CPU and the second CPU at the same time.

17. The method as in claim 16, wherein:

the retrieved data is limited to data that are shared by both of the first CPU and the second CPU.

18. The method as in claim 17, further comprising:

generating individual data retrieving commands from the first CPU and the second CPU to retrieve individual data other than the data to be shared from the non-volatile memory, respectively, after the data receiving step.

19. The method as in claim 16, further comprising:

initializing system registers of the first CPU and the second CPU at the same time immediately after a start of power supply to the first CPU and the second CPU before generating the data retrieving command from the first CPU.

20. The method as in claim 19, further comprising:

generating individual data retrieving commands from the first CPU and the second CPU to retrieve individual data other than the data to be shared from the non-volatile memory, respectively, after the data receiving step.

21. An electronic control unit as in claim 1 wherein:

the single non-volatile memory is connected to the CPUs so that data in the single non-volatile memory is commonly used by the CPUs.

22. An electronic control unit as in claim 6 wherein:

the single non-volatile memory is connected to the CPUs so that data in the single non-volatile memory is commonly used by the CPUs.

23. A data retrieving method as in claim 11 wherein:

the single non-volatile memory is connected to the CPUs so that data in the single non-volatile memory is commonly used by the CPUs.

* * * * *